United States Patent
Sun et al.

(10) Patent No.: US 10,204,591 B2
(45) Date of Patent: Feb. 12, 2019

(54) DISPLAY DEVICE AND DISPLAY CONTROL METHOD THEREOF

(71) Applicant: BOE Technology Group Co., Ltd., Beijing (CN)

(72) Inventors: Mengmeng Sun, Beijing (CN); Ruisi Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/538,290

(22) PCT Filed: Dec. 5, 2016

(86) PCT No.: PCT/CN2016/108540
§ 371 (c)(1),
(2) Date: Jun. 21, 2017

(87) PCT Pub. No.: WO2017/121207
PCT Pub. Date: Jul. 20, 2017

(65) Prior Publication Data
US 2018/0108324 A1    Apr. 19, 2018

(30) Foreign Application Priority Data
Jan. 13, 2016    (CN) .......................... 2016 1 0019359

(51) Int. Cl.
*G09G 5/02*        (2006.01)
*G06F 3/0481*    (2013.01)
(Continued)

(52) U.S. Cl.
CPC .............. *G09G 5/02* (2013.01); *G06F 3/0481* (2013.01); *G09G 5/006* (2013.01); *G09G 5/14* (2013.01);
(Continued)

(58) Field of Classification Search
CPC ... G09G 5/02; G09G 5/006; G09G 2320/0666
See application file for complete search history.

(56) References Cited

U.S. PATENT DOCUMENTS 5,521,615 A * 5/1996 Boyan ................. G06F 3/04897
345/594
8,350,869 B1* 1/2013 Borg ........................ G09G 5/02
345/589

FOREIGN PATENT DOCUMENTS

CN    101287248 A    10/2008
CN    101388203 A     3/2009
(Continued)

OTHER PUBLICATIONS

Mar. 8, 2017—(WO International Search Report and Written Opinion Appn PCT/CN2016/108540 with English Tran.
(Continued)

*Primary Examiner* — Antonio A Caschera
(74) *Attorney, Agent, or Firm* — Banner & Witcoff, Ltd.

(57) ABSTRACT

A display device and a display control method therefor. The display device includes a display interface, and the display control method includes: controlling the display interface to display at least two image windows in response to a start signal of a dyschromatopsia display mode, wherein the respective image windows are different in color mode of image content, and the color mode of the image content in at least one of the at least two image windows is a color mode suitable for being viewed by a dyschromatopsia sufferer; and in response to a signal generated by selecting one of the at least two image windows, controlling a color mode of the display interface to be the same as that of the image content in the selected image window.

18 Claims, 2 Drawing Sheets

When a triggering command of the dyschromatopsia display mode is received, displaying two or more image windows, wherein the respective image windows are different in color mode of the image, and the color mode of the image in each image window is a color mode suitable for viewed by a dyschromatopsia sufferer after color conversion according to color distinguishing features of the dyschromatopsia sufferer — S101

When a triggering command of any one of the two or more image windows is received, changing the color mode of the display interface to be same as that of the image in this image window — S102

(51) Int. Cl.
*G09G 5/00* (2006.01)
*G09G 5/14* (2006.01)
*G06F 3/0482* (2013.01)

(52) U.S. Cl.
CPC ... *G06F 3/0482* (2013.01); *G09G 2320/0666* (2013.01); *G09G 2320/0686* (2013.01); *G09G 2354/00* (2013.01)

(56) References Cited

FOREIGN PATENT DOCUMENTS

| | | |
|---|---|---|
| CN | 102005202 A | 4/2011 |
| CN | 102289789 A | 12/2011 |
| CN | 103310736 A | 9/2013 |
| CN | 103870148 A | 6/2014 |
| CN | 104063193 A | 9/2014 |
| CN | 105700771 A | 6/2016 |

OTHER PUBLICATIONS

Jul. 25, 2017—(CN) First Office Action Appn 201610019359.2 with English Tran.
Dec. 19, 2017—(CN) Second Office Action Appn 201610019359.2 with English Tran.

* cited by examiner

DISPLAY DEVICE AND DISPLAY CONTROL METHOD THEREOF

The application is a U.S. National Phase Entry of International Application No. PCT/CN2016/108540 filed on Dec. 5, 2016, designating the United States of America and claiming priority to Chinese Patent Application No. 201610019359.2 filed on Jan. 13, 2016. The present application claims priority to and the benefit of the above-identified applications and the above-identified applications are incorporated by reference herein in their entirety.

TECHNICAL FIELD

Embodiments of the present disclosure relate to a display device and a display control method thereof.

BACKGROUND

Currently, a multimedia technology has entered people's life completely, and most manners that people use to obtain information rely on electronic display devices, such as televisions, displays, mobile phones, etc. However, most existing display devices only provide a normal display image in a standard color mode, while dyschromatopsia sufferers difficultly recognize some colors because of their disabilities; therefore, the image is unclear when they views the image on the display device or the image content is hard to distinguish; as a result, it is hard for them to accurately obtain information through the display device.

SUMMARY

An embodiment of the present disclosure provides a display control method for a display device, the display device comprising a display interface, and the display control method including:

controlling the display interface to display at least two image windows in response to a start signal of a dyschromatopsia display mode, wherein the respective image windows are different in color mode of image content, and the color mode of the image content in at least one of the two or more image windows is a color mode suitable for viewed by a dyschromatopsia sufferer after an original image content is subjected to color conversion according to a distinguishing color feature of the dyschromatopsia sufferer; and in response to a signal generated by selecting one of the at least two image windows, controlling a color mode of the display interface to be same as that of the image content in the selected image window.

In an example, the start signal of the dyschromatopsia display mode is a triggering command of the dyschromatopsia display mode.

In an example, the signal generated by selecting one of the at least two image windows is a triggering command in one of the at least two image windows.

In an example, the controlling the display interface to display at least two image windows in response to a start signal of a dyschromatopsia display mode includes controlling the display interface to simultaneously display the at least two image windows in response to the start signal of the dyschromatopsia display mode.

In an example, the controlling the display interface to display at least two image windows in response to a start signal of a dyschromatopsia display mode includes controlling the display interface to display at least two image windows in a switching manner in response to the start signal of the dyschromatopsia display mode.

In an example, the image contents displayed in the at least two image windows are all same except for color mode.

In an example, the color mode of the image content in each of the image windows is a color mode after the original image content is subjected to color conversion according to a color vision compensation algorithm.

In an example, the color vision compensation algorithm is a color vision compensation algorithm based on a hexcone color space model (HSV).

In an example, the original image content is a video stored in a display device.

In an example, the original image content is a picture or video captured by a camera of a display device.

In an example, before controlling the display interface to display the at least two image windows in response to the start signal of the dyschromatopsia display mode, the method further includes:

controlling the display interface to display a mode selection menu including a normal display mode option and a dyschromatopsia display mode option.

Another embodiment of the present disclosure provides display device, including:

a display unit, comprising a display interface, configured to display two or more image windows in response to a start signal of a dyschromatopsia display mode, wherein the respective image windows are different in color mode of image content, and the color mode of the image content in at least one of the two or more image windows is a color mode suitable for viewed by after original image content is subjected to color conversion according to distinguishing color feature of the dyschromatopsia sufferer; and a control unit, configured to, in response to a signal selected by one of the at least two image windows, control the color mode of the display interface of the display unit to be same as that of the image content in the image window.

In an example, the display unit is further configured to display the two or more image windows simultaneously in response to the start signal of a dyschromatopsia display mode.

In an example, the display unit is further configured to display the two or more image windows in a switching manner in response to the start signal of a dyschromatopsia display mode.

In an example, the image contents displayed by the two or more image windows are all same except for color mode.

In an example, in the two or more image windows, the color mode of the image in each image window is a color mode after original image content is subjected to color conversion according to color vision compensation algorithm.

In an example, the color vision compensation algorithm is a color vision compensation algorithm based on a hexcone color space model (HSV).

In an example, the original image content is a video stored in a display device.

In an example, the display device further includes a camera, and the original image content is a picture or video captured by the camera of the display device.

In an example, the display unit is further configured to, before displaying two or more image windows, display a mode selection menu including a normal display mode option and a dyschromatopsia display mode option.

DETAILED DESCRIPTION

The technical solutions of embodiments of the present disclosure will be described in a clearly and fully understandable way in connection with the drawings of the embodiments of the present disclosure. It is obvious that the described embodiments are just a part but not all of the embodiments of the disclosure. Based on the described embodiments of the present disclosure herein, those ordinary skilled in the art can obtain all other embodiment(s), without any inventive work, which should be within the scope of the disclosure.

Embodiments of the present disclosure provide a display device and a display control method thereof, which can meet display requirements of dyschromatopsia sufferers.

Figure 1:
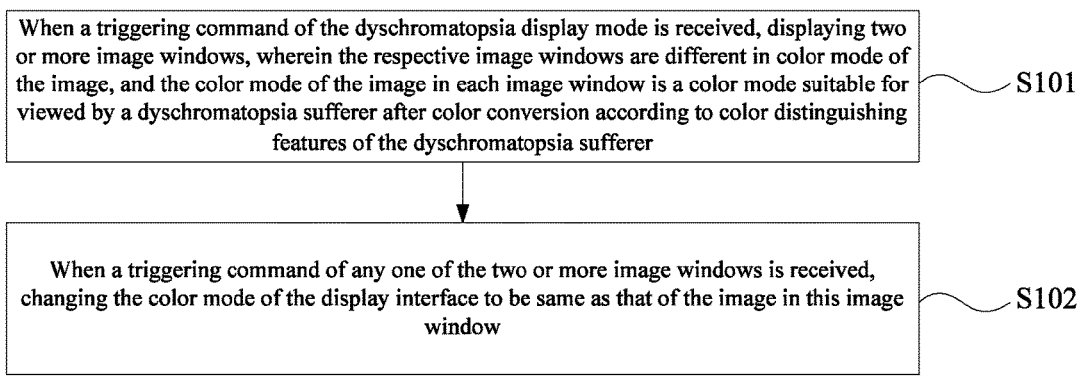
FIG. 1 is flowchart of a display control method for a display device provided by an embodiment of the present disclosure.
Figure 2:
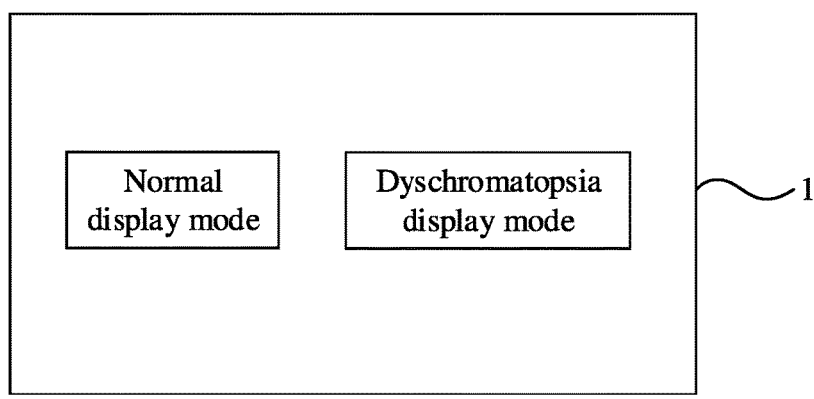
FIG. 2 is a schematic diagram of a display interface during displaying of a display device provided by an embodiment of the present disclosure.
Figure 3:
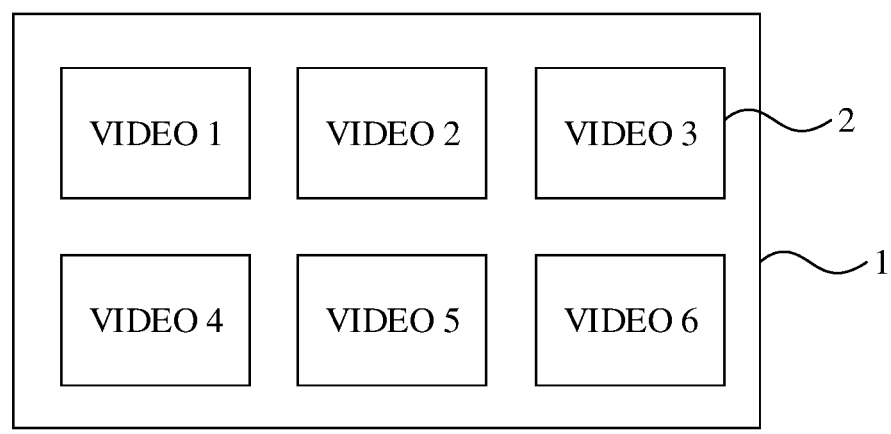
FIG. 3 is a schematic diagram of another display interface during displaying of a display device provided by an embodiment of the present disclosure.

Reference is made to FIGS. 1, 2 and 3.

An embodiment of the present disclosure provides a display control method for a display device, the display device includes a display interface; the display control method includes: controlling the display interface to display two or more image windows in response to a start signal of a dyschromatopsia display mode, wherein the respective image windows are different in color mode of the image, and the color mode of the image content in at least one of the two or more image windows is a color mode suitable for viewed by a dyschromatopsia sufferer after original image content is subjected to color conversion according to distinguishing color feature of the dyschromatopsia sufferer; and in response to a signal generated by selecting one of the two or more image windows, controlling the color mode of the display interface to be same as that of the image content in the selected image window.

As shown in FIG. 1, the display control method for a display device provided by the embodiment of the present disclosure, for example, can include:

Step S101: when a triggering command of a dyschromatopsia display mode is received, displaying two or more image windows, wherein the respective image windows are different in color mode of image, and the color mode of each of the images displayed in the image windows is a color mode suitable for viewed by a dyschromatopsia sufferer after subjected to color conversion according to distinguishing color feature of the dyschromatopsia sufferer; and Step S102: when a triggering command of any one of the two or more image windows is received, changing the color mode of the display interface to be same as that of the image in the image window, Wherein the dyschromatopsia mainly includes color vision defects such as achromatopsia and hypochromatopsia.

In the display control method for a display device provided by the embodiment of the present disclosure, when the triggering command of the dyschromatopsia display mode is received, the display device can display two or more image windows, wherein the respective image windows are different in color mode of image, and the color mode of the image in each image window is a color mode suitable for viewed by one kind of a dyschromatopsia sufferer after subjected to color conversion according to distinguishing color feature of the one kind of dyschromatopsia sufferer; and when the display device receives the triggering command of a certain one image window, the color mode of the display interface of the display device can be changed to be same as that of the image in the image window, so as to realize conversion of the color mode of the display interface; therefore, the display control method for a display device provided by the embodiment of the present disclosure can meet requirements of the dyschromatopsia sufferer on the color mode of the display interface of the display device, and a dyschromatopsia user can conveniently select the color mode more suitable for himself/herself to view the display device.

As shown in FIG. 3, for example, when the display device receives the triggering command of the dyschromatopsia display mode, two or more image windows 2 can be displayed simultaneously, such that a color mode suitable for the user to view can be selected by the user in a case of displaying two or more image windows simultaneously.

For example, when the display device receives the triggering command of the dyschromatopsia display mode, two or more image windows can be displayed in a switching manner, such that the color mode suitable for the user to view can be selected by the user after browsing.

As shown in FIG. 3, based on the embodiment above, for example, the image contents in the two or more image windows 2 can be totally same except for the color modes; that is, the two or more image windows 2 play the image with the same content, only the color mode of the image in each image window 2 is different.

The plurality of image windows 2 are displayed simultaneously, and the image contents, except for the color mode, in the plurality of image windows 2 are the same, such that the dyschromatopsia user can more easily differentiate which image is clearer through contrastive analysis, and further, by triggering the image window 2 where the image located in, the color mode of the display interface of the display device is converted to the same as the color mode of the image.

As shown in FIG. 3, based on respective embodiments above, for example, the color mode of the image in each image window 2 can be the color mode after subjected to color conversion according to a color vision compensation algorithm; that is, the color mode of the image in each image window 2 is obtained by performing color conversion on an original image of a normal color mode by using different color vision compensation algorithms.

For example, the color vision compensation algorithm is a color vision compensation algorithm based on a hexcone color space model (HSV). For example, the color vision compensation algorithm based on HSV is to map color parts that are not easily differentiated by a dyschromatopsia sufferer onto the color parts that are easily differentiated, for example ten compensation algorithms can be obtained based on the HSV; that is, based on the HSV, in the display control method for a display device provided by the embodiments of the present disclosure, for example ten images in different color modes can be provided for the dyschromatopsia sufferer to select.

Further, for example, the original image for image processing can be a video stored in a memory of the display device, that is, the image content displayed by two or more image windows 2 can be the video stored in the memory of the display device. Besides, the color of the original image should be rich and colorful, the image color mode formed after such original image is processed by different color vision compensation algorithms has larger difference, that is, the color mode of the image displayed in each image window 2 has larger difference, therefore, selection by various kinds of dyschromatopsia sufferers is facilitated; for example, the original image content can be video clips capable of testing various types of dyschromatopsia.

By adopting different color vision compensation algorithms to perform color conversion on the original image rich in color, many images having different color modes can be obtained, and each image is suitable for viewed by one kind of dyschromatopsia sufferer; therefore, every type of dyschromatopsia users can find the color mode of the display interface suitable for viewed by themselves. For example, the image suitable for viewed by achromatopsia sufferers such as red achromatopsia, green achromatopsia, and blue-yellow red achromatopsia can be obtained by adopting the color vision compensation algorithm.

Or, the original image can be a picture or video captured by a camera of the display device, that is, the image contents displayed by two or more image windows 2 can be a picture or video captured by the camera of the display device.

Based on respective embodiments above, for example, the display control method for the display device provided by the embodiment of the present disclosure, before step S101, i.e., receiving a triggering command of the dyschromatopsia display mode and displaying two or more image windows, further comprises:

controlling the display interface to display a mode selection menu including a normal display mode option and a dyschromatopsia display mode option.

Further, the display control method for the display device provided by the present disclosure can further comprise:

when a triggering command of the normal display mode is received, enabling the display device to normally display.

In the display control method for a display device provided by the embodiment of the present disclosure, the display device can receive the dyschromatopsia display command to enter an operation interface for selecting the color mode as shown in FIG. 3, and can also receive a normal display mode command to enter a normal display interface; that is, the display control method for a display device can provide a dyschromatopsia display mode and a normal display mode for the user; for example, as shown in FIG. 2, after the display device is started up, a selection menu including the normal display mode and the dyschromatopsia display mode can be displayed on the display interface; a common user can select the normal display mode to directly enter a conventional color mode display interface; the dyschromatopsia user can select dyschromatopsia display and enter the operation interface for selecting the color mode as shown in FIG. 3, and can select an interface color mode suitable for himself/herself in the operation interface for selecting the color mode. Therefore, the display control method for a display device provided by the embodiment of the present disclosure can provide common image display for common crowds and can also provide image display suitable for viewed by the dyschromatopsia sufferers.

It is noted that FIGS. 2 and 3 are merely simple schematic diagrams, the selection menu of the display mode mentioned above is not limited to the manner in the display interface of FIG. 2, meanwhile, the operation interface for selecting the color mode of the display device is not limited to the manner in the display interface of FIG. 3.

The display control method for a display device provided by the embodiment of the present disclosure can be suitable for a display process of a display device such as a computer display, a television, or a mobile phone.

In addition, according to the display control method for a display device provided by the embodiment of the present disclosure, if the proper interface color mode is not selected after starting up, the user can enter the mode selection menu by the triggering command to further switch the interface color mode during displaying of the display device.

An embodiment of the present disclosure further provides a display device, including a display unit, having a display interface, and configured to display two or more image windows in response to a start signal of a dyschromatopsia display mode, wherein the respective image windows are different in color mode of the image, and the color mode of the image in at least one of the two or more image windows is a color mode suitable for viewed by one kind of dyschromatopsia sufferer after original image content is subjected to color conversion according to distinguishing color feature of the one kind of dyschromatopsia sufferer; and a control unit, configured to, in response to a signal selected by one of the two or more image windows, control the color mode of the display interface of the display device to be same as that of the image content in the selected image window.

For example, as shown in FIG. 2 and FIG. 3, the display device includes:

a display unit 1, configured to display two or more image windows 2 when the display device receives a triggering command of the dyschromatopsia display mode, wherein the respective image window 2 are different in color mode of image, and the color mode of the image in each image window 2 is a color mode suitable for viewed by one kind of dyschromatopsia sufferer after color conversion according to distinguishing color feature of the one kind of dyschromatopsia sufferer;

An adjusting unit, serving as the control unit, configured to adjust the color mode of the display interface of the display unit 1 to be same as that of the image content in any one of the image windows 2 when the display device receives the triggering command of the any one of the at least two image windows 2.

According to the display device provided by the embodiment of the present disclosure, when the triggering command of the dyschromatopsia display mode is received, as shown in FIG. 3, the display unit 1 can display at least two image windows 2, wherein the color modes of the images in the respective image windows 2 are different, and the color mode of the image in each image window 2 is a color mode suitable for viewed by one kind of dyschromatopsia sufferer after color conversion according to distinguishing color feature of the one kind of dyschromatopsia sufferer; and when the display device receives the triggering command of a certain one image window 2, the color mode of the display interface of the display unit 1 can be same as the color mode of the image in this image window 2, so as to realize conversion of the color mode of the display interface. Therefore, the display device provided by the present disclosure can meet requirements of dyschromatopsia sufferer on the color mode of the display interface of the display device, and a dyschromatopsia user can conveniently select the color mode more suitable for himself/herself to view the display device.

As shown in FIG. 3, in the display device provided by the embodiment of the present disclosure, when the display device receives the triggering command of the dyschromatopsia display mode, the display unit 1 can display at least two image windows 2 simultaneously.

In the display device provided by the embodiment of the present disclosure, when the display device receives the triggering command of the dyschromatopsia display mode, the display unit 1 can display the at least two image windows 2 in a switching manner.

As shown in FIG. 3, based on the embodiment above, for example, the image contents in the at least two image windows 2 displayed by the display unit 1 are the same.

For example, the image contents displayed by the at least two image windows 2 can be the videos stored in a memory of the display device.

The plurality of image windows 2 are displayed simultaneously, and the image contents, except for the color mode, in the plurality of image windows 2 are displayed simultaneously, such that the dyschromatopsia user can more easily differentiate which image is clearer through contrastive analysis, and further, by triggering the image window 2 of this image, the color mode of the display interface of the display device is converted to be same as the color mode of the image.

Or, the display device further includes a camera, and the image contents displayed by the at least two image windows can be a picture or video captured by the camera of the display device.

As shown in FIG. 3, based on respective embodiments above, for example, the color mode of the image in each image window 2 can be the color mode after color conversion on the original image content according to a color vision compensation algorithm; for example, the color mode of the image in each image window 2 is obtained by performing color conversion on one original image in a conventional color mode by using different color vision compensation algorithms.

For example, the color vision compensation algorithms are color vision compensation algorithms based on a hexcone color space model (HSV). For example, the color vision compensation algorithm based on HSV is to map color parts that are not easily differentiated by dyschromatopsia patients onto the color parts that are easily differentiated, for example ten compensation algorithms can be obtained based on the HSV, that is, based on the HSV, in the display control method for a display device provided by the embodiment of the present disclosure, for example, ten images in different color modes can be provided for the dyschromatopsia sufferer to select.

As shown in FIG. 2, based on respective embodiments above, for example, after the display device of the embodiment of the present disclosure is started up or receives a triggering command for mode switching, the display unit 1 can further display a mode selection menu, and the mode selection menu can include a normal display mode option and a dyschromatopsia display mode option.

Further, if the display device provided by the present disclosure receives the triggering command of a normal display mode, the display device 1 normally displays, i.e., directly enters a conventional color mode display interface; if the display device provided by the embodiment of present disclosure receives the triggering command of the dyschromatopsia display mode, the display unit 1 enters an operation interface for selecting the color mode as shown in FIG. 3; in this case, the user can select an interface color mode suitable for himself/herself in the operation interface for selecting the color mode and selects by the triggering command, so as to realize selection on the color mode.

The display device in the embodiment of the present disclosure can be a display device such as a computer display, a television or a mobile phone.

It is noted that FIGS. 2 and 3 are merely simple schematic diagrams, the selection menu of the display mode mentioned above is not limited to the manner in the display interface of FIG. 2, meanwhile, the operation interface for selecting the color mode of the display device is not limited to the manner in the display interface of FIG. 3.

It is evident that a person skilled in the art can make various changes or modifications to the present disclosure without departing from the spirit and scope of the present disclosure. Thus, if such changes and modifications to the present disclosure are within the scope of the claims of the present disclosure and equivalent thereof, the present disclosure also intends to include all such changes and modifications within its scope.

The foregoing embodiments merely are exemplary embodiments of the disclosure, and not intended to define the scope of the disclosure, and the scope of the disclosure is determined by the appended claims.

The application claims priority of Chinese Patent Application No. 201610019359.2 filed on Jan. 13, 2016, the disclosure of which is incorporated herein by reference in its entirety as part of the present application.

The invention claimed is:

1. A display control method for a display device, the display device comprising a display interface, the display control method comprising:

controlling the display interface to display at least two image windows in response to a start signal of a dyschromatopsia display mode, wherein the respective image windows are different in color mode of image content, and the color mode of the image content in at least one of the at least two image windows is a color mode suitable for being viewed by a dyschromatopsia sufferer after an original image content is subjected to color conversion according to a distinguishing color feature of the dyschromatopsia sufferer; and in response to a signal generated by a selection of one of the at least two image windows, controlling a color mode of the display interface to be the same as that of the image content in the selected image window, wherein the color mode of the image content in each of the image windows is a color mode after the original image content is subjected to color conversion according to a color vision compensation algorithm.

2. The display control method for the display device according to claim 1, wherein the start signal of the dyschromatopsia display mode is a triggering command of the dyschromatopsia display mode.

3. The display control method for the display device according to claim 1, wherein the signal generated by the selection of one of the at least two image windows is a triggering command in one of the at least two image windows.

4. The display control method for the display device according to claim 1, wherein the controlling the display interface to display at least two image windows in response to the start signal of the dyschromatopsia display mode includes controlling the display interface to simultaneously display the at least two image windows in response to the start signal of the dyschromatopsia display mode.

5. The display control method for the display device according to claim 1, wherein the controlling the display interface to display at least two image windows in response to the start signal of the dyschromatopsia display mode includes controlling the display interface to display the at least two image windows in a switching manner in response to the start signal of the dyschromatopsia display mode.

6. The display control method for the display device according to claim 1, wherein the image contents displayed in the at least two image windows are all the same, except for color mode.

7. The display control method for the display device according to claim 1, wherein the color vision compensation algorithm is based on a hexcone color space model (HSV).

8. The display control method for the display device according to claim 1, wherein the original image content is a video stored in the display device.

9. The display control method for the display device according to claim 1, wherein the original image content is a picture or video captured by a camera of the display device.

10. The display control method for the display device according to claim 1, wherein before controlling the display interface to display the at least two image windows in response to the start signal of the dyschromatopsia display mode, the method further comprises:
controlling the display interface to display a mode selection menu including a normal display mode option and a dyschromatopsia display mode option.

11. A display device, comprising:
a display unit, comprising a display interface, configured to display two or more image windows in response to a start signal of a dyschromatopsia display mode, wherein the respective image windows are different in color mode of image content, and wherein the color mode of the image content in at least one of the two or more image windows is a color mode suitable for being viewed by a dyschromatopsia sufferer after original image content is subjected to color conversion according to a distinguishing color feature of the dyschromatopsia sufferer; and
a control unit, configured to, in response to a signal generated by a selection of one of the two or more image windows, control the color mode of the display interface of the display unit to be the same as that of the image content displayed in the image window,
wherein, in the two or more image windows, the color mode of the image content in each image window is a color mode after original image content is subjected to color conversion according to a color vision compensation algorithm.

12. The display device according to claim 11, wherein the display unit is further configured to display the two or more image windows simultaneously in response to the start signal of the dyschromatopsia display mode.

13. The display device according to claim 12, wherein the image contents displayed by the two or more image windows are all the same, except for color mode.

14. The display device according to claim 11, wherein the display unit is further configured to display the two or more image windows in a switching manner in response to the start signal of the dyschromatopsia display mode.

15. The display device according to claim 11, wherein the color vision compensation algorithm is based on a hexcone color space model (HSV).

16. The display device according to claim 11, wherein the original image content is a video stored in the display device.

17. The display device according to claim 11, wherein the display device further includes a camera, and the original image content is a picture or a video captured by the camera of the display device.

18. The display device according to claim 11, wherein the display unit is further configured to, before displaying the two or more image windows, display a mode selection menu including a normal display mode option and a dyschromatopsia display mode option.

* * * * *